(12) United States Patent
Grieβer et al.

(10) Patent No.: US 7,200,514 B2
(45) Date of Patent: Apr. 3, 2007

(54) METHOD FOR DETECTING STRAIGHT-AHEAD DRIVING BASED ON INFORMATION ON THE ROTATIONAL SPEED OF A WHEEL

(75) Inventors: Martin Grieβer, Eschborn (DE); Andreas Köbe, Bensheim (DE); Frank Edling, Frankfurt am Main (DE); Vladimir Koukes, Darmstadt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 10/511,052

(22) PCT Filed: Apr. 30, 2003

(86) PCT No.: PCT/EP03/04525

§ 371 (c)(1), (2), (4) Date: Oct. 12, 2004

(87) PCT Pub. No.: WO03/093035

PCT Pub. Date: Nov. 13, 2003

(65) Prior Publication Data

US 2005/0154554 A1 Jul. 14, 2005

(30) Foreign Application Priority Data

May 3, 2002 (DE) ................................ 102 19 933

(51) Int. Cl.
*G01P 3/00* (2006.01)
(52) U.S. Cl. ..................................................... 702/145
(58) Field of Classification Search ........ 702/145–148; 701/72, 97; 340/444
See application file for complete search history.

(56) References Cited

U.S. PATENT DOCUMENTS 6,137,400 A * 10/2000 Yanase et al. .............. 340/442
6,222,444 B1 * 4/2001 Wang ......................... 340/442
6,289,272 B1 * 9/2001 Batistic et al. ................ 701/72
6,393,376 B1 * 5/2002 Andreas ...................... 702/157
6,725,135 B2 * 4/2004 McKeown et al. ........... 701/29
6,817,236 B1 * 11/2004 Griesser et al. ............ 73/146.2
6,941,212 B2 * 9/2005 Sakata .......................... 701/72

FOREIGN PATENT DOCUMENTS

| DE | 100 58 140 A1 | 1/2002 |
|---|---|---|
| DE | 100 34 224 A1 | 2/2002 |
| EP | 0 712 740 A2 | 5/1996 |
| EP | 0 897 816 A2 | 2/1999 |
| EP | 0 979 763 A2 | 2/2000 |
| EP | 0 983 154 A1 | 3/2000 |

OTHER PUBLICATIONS

International Search Report of Application No. PCT/EP03/04525 dated Jul. 24, 2003.

* cited by examiner

*Primary Examiner*—John Barlow
*Assistant Examiner*—Jonathan Moffat
(74) *Attorney, Agent, or Firm*—RatnerPrestia

(57) ABSTRACT

The present invention relates to a method of detecting straight-ahead driving according to a first straight-ahead driving detection method based on information on the rotational speed of a wheel by way of memorizing a curve parameter in a learning phase, in particular in selected driving situations, and the curve parameter is formed from the wheel speed information of one or more axles, and the reciprocal value of the curve radius is calculated from the wheel speed information to determine the curve parameter. The invention also relates to a computer program product comprising an algorithm defined by the above method.

17 Claims, No Drawings

METHOD FOR DETECTING STRAIGHT-AHEAD DRIVING BASED ON INFORMATION ON THE ROTATIONAL SPEED OF A WHEEL

TECHNICAL FIELD

The present invention relates to a method for detecting straight-ahead driving based on information on the rotational speed of a wheel and a computer program product.

BACKGROUND OF THE INVENTION

In motor vehicles with brake systems equipped with ABS control, driving dynamics control, or similar systems, it is conventional practice in electronic control devices to implement most different methods for detecting driving situations by way of a microprocessor. In practically all methods for detecting the driving situation, input signals of wheel speed sensors for detecting the driving situation are evaluated either alone or jointly with further sensors (yaw rate, transverse acceleration, etc.) if these further sensors (so-called ESP sensor equipment) are provided in the vehicle.

DE-A 100 58 140 discloses, for example, that tire pressure losses can be detected on the basis of wheel speed information alone. A basic condition for a high-quality detection is the reliable detection of driving situations that are appropriate for determining data. A particularly appropriate driving situation for determining data is the straight-ahead driving of the vehicle.

BRIEF SUMMARY OF THE INVENTION

Previously attempts have been made according to the state of the art to determine the yaw rate or the transverse acceleration from the wheel speed information as precisely as possible in order to detect straight travel.

The invention at issue departs from this idea and instead takes into account inverted curve radii calculated from the wheel speeds. It has surprisingly shown that an examination of the inverted curve radii leads to a higher rate of precision when this principle is used in a per se known pressure loss detection method on the basis of wheel speed sensors (DDS: Deflation Detection System, see EP-A 0 983 154).

In view of the above, the invention relates to a method of detecting straight-ahead driving according to a first straight-ahead driving detection method on the basis of wheel speed information by memorizing a curve parameter in a learning phase, in particular in selected driving situations, wherein the curve parameter is formed from the wheel speed information of one or more axles, and the reciprocal value of the curve radius is calculated from the wheel speed information to determine the curve parameter.

The said reciprocal value is preferably derived from the ratio of rotational speeds between front wheels and rear wheels. According to another preferred embodiment of the invention, an inverted curve radius is formed and, more particularly, memorized, separately for the front axle and the rear axle.

The reciprocal value is filtered especially mathematically according to a per se known algorithm. Said algorithm is preferably a recursive filtering method which is advantageous in terms of a low consumption of memory locations, as described in DE 100 34 224 A1, for example.

Current appropriate curve values are memorized during the reciprocal-values learning phase so that the statistic quality of the learnt value is normally constantly improved.

Preferably, the learning phase is terminated when a scatter quantity that has to be suitably selected falls below a threshold value. Appropriate curve values are preferably those for which the inverted curve radius falls below a predetermined threshold value.

In the phase of comparison that follows the learning phase after the learning phase is completed, the DDS system is preferably deactivated only when cornering is detected simultaneously on both axles (likewise examination of threshold values). For this reason, any pressure loss occurring on an axle cannot deactivate the system.

It is preferred that the currently determined curve parameter is averaged and/or filtered. The memorized curve parameter is also favorably averaged and/or filtered.

Advantageously, the curve parameters are memorized individually for several speed intervals, e.g. in a first speed interval of 15 km/h up to 70 km/h, in a second speed interval of 70 km/h up to 100 km/h, in a third speed interval of 100 km/h up to 130 km/h, etc.

The curve parameter is favorably memorized in the driving situation 'straight-ahead driving', and a second straight-ahead driving detection method is used for detecting this driving condition.

A coarse detection of straight-ahead driving can be executed by way of a separate method (second straight-ahead driving detection method). Favorably, already memorized values of the first straight-ahead driving detection method are ignored when a cornering maneuver is detected by means of the second straight-ahead driving detection method. This second method detects in particular when the assumption 'straight-ahead driving' was not sufficiently precise for learning the inverting curve radii. The learnt value is then omitted. Criteria for activating/deactivating DDS can be derived from an estimated yaw rate and transverse acceleration.

The memorized curve parameter(s) is(are) preferably taken into account to calculate real driving parameters such as curve radius, vehicle yaw rate, and/or vehicle transverse acceleration.

Advantageously, the memorized curve parameter is taken into account for calculating the driving parameter 'actual curve radius'.

The first method for cornering detection is preferably integrated into a method for detecting tire pressure loss on the basis of wheel speed information. The first method for cornering detection is especially taken into consideration for activating and/or deactivating said pressure loss detection method.

The above-mentioned driving parameters such as yaw rate or transverse acceleration are favorably taken into consideration for activating and/or deactivating the pressure loss detection.

DETAILED DESCRIPTION OF THE PREFERRED EMBODIMENTS

Hereinbelow, the method of detecting straight-ahead driving will be explained by taking into account the method for pressure loss detection in tires of motor vehicles as described in DE 100 58 140 A1. DE 100 58 140 A1 discloses a method for straight-ahead driving detection on the basis of yaw rate information. The straight-ahead driving detection or cornering detection represents an important output quantity for a tire pressure loss detection method based on wheel speed information. E.g. the rotational speed of an inside wheel in a turn differs from the rotational speed of an outside wheel in a turn due to a cornering maneuver. A prior art tire pressure loss detection method is unable to recognize whether the rotational speed variation is caused by pressure loss or by a cornering maneuver, with the result that undesirable spurious alarms may occur, or only very long observation times are allowed to be used for an alarm. It is therefore absolutely necessary for safe and quick pressure loss detection that cornering or straight-ahead driving is safely detected. Prior-art tire pressure loss detection methods use a yaw rate sensor for this purpose, which is e.g. provided in an ESP system. Because not all the vehicles are equipped with an ESP system, the method of the invention describes a straight-ahead driving detection on the basis of the existing wheel speed sensors. The method described in the following is especially used in connection with a tire pressure loss detection method, and the tire pressure loss detection method is not performed until the straight-ahead driving detection method has detected straight-ahead driving. Or, respectively, the tire pressure loss detection method is not performed when the cornering detection method has detected cornering. Straight-ahead driving detection or cornering detection must be regarded as equivalent in this case because it is insignificant whether the tire pressure loss detection method is performed only after detection of straight-ahead driving or is interrupted by the detection of a cornering maneuver.

Exactly as the prior-art tire pressure loss detection method (DDS), the method of the invention is started by way of actuating a reset button. It is necessary to this end that the driver has adjusted the prescribed nominal pressure in all tires before the reset button is actuated. As even tires of the same type have discrepancies with respect to each other, e.g. in terms of their rolling radii or their speed-responsive expansion, it is necessary to memorize these tire irregularities. Said tire irregularities are memorized in a learning phase as so-called offset values in the form of learnt inverted curve radii per vehicle axle in different speed intervals. The learnt inverted curve radius is essentially composed of a quotient, the numerator exhibiting the difference between the wheel speeds of an axle, or values proportional to the wheel speeds, while the denominator is composed of the multiplication of the vehicle's track width and the vehicle reference speed. E.g. the vehicle speed calculated by an ABS is used herein as the vehicle reference speed. Further, the quotient can be extended by additional scale factors to shift the learnt inverted curve radii into suitable ranges of values (e.g. for integral calculus). An inverted curve radius for each vehicle axle is learnt, and these learnt inverted curve radii permit determining in addition values describing a yaw rate or a transverse acceleration. The learnt inverted curve radii and the additional values (yaw rate, transverse acceleration) are stored in a memory (EEPROM). In addition, the learnt inverted curve radii can be filtered and stored according to generally known algorithms. The tire pressure loss detection method (DDS) remains deactivated during the reciprocal-values learning phase. The reciprocal-values learning phase is terminated when a scatter quantity that must be selected appropriately falls below a threshold value. Nevertheless, the inverted curve radii are stored in a long-term storage and constantly compared with currently determined inverted curve radii in order to ensure that actually it was the straight travel defined in the reciprocal-values learning phase that prevailed rather than a long cornering maneuver.

In a subsequent phase of comparison, currently established inverted curve radii are determined for each axle from the wheel speeds, as described in the reciprocal-values learning phase. These currently determined inverted curve radii are compared with the learnt inverted curve radii. If cornering is detected simultaneously on both axles, DDS is deactivated. If only one axle exhibits straight travel, DDS remains active. Alternatively, it is also possible to use only the freely rolling axle as a reference for straight-ahead driving because a superposition of a cornering maneuver with a driving torque on one or both driven wheels of the driven axle can induce a wrong interpretation with respect to a prevailing straight travel. In this respect, the inverted curve radii are continuously monitored in the long-term storage as described hereinabove. If it is detected in a comparison of the values for the learnt inverted curve radii stored in the long-term storage that a currently determined inverted curve radius rather describes straight-ahead driving, a new start of the reciprocal-values learning phase is carried out. Likewise values for a determined yaw rate and a determined transverse acceleration can be defined from the determined inverted curve radii. This helps now as before achieving a qualitatively good straight-ahead driving detection even in the case of pressure loss on the freely rolling axle.

The method of the invention is favorably used for activating or deactivating a tire pressure loss detection method (DDS) that determines pressure loss on the basis of the wheel speed information. Either the inverted curve radii or the yaw rates or transverse accelerations calculated therefrom can be used as selection criteria in this arrangement.

The invention claimed is:

1. Method for detecting straight-ahead driving according to a first straight-ahead driving detection method on the basis of vehicle-installed wheel speed information, comprising:

initiating a curve parameter learning phase for a given set of wheels during on-road operation of the wheels including:
    measuring the wheel speed of each wheel of the set of wheels at a first speed within a first given wheel speed interval and calculating a first stored curve parameter based on a reciprocal value of the curve radius of each wheel from the respective wheel speed measured at the first speed; and
    measuring the wheel speed of each wheel of the set of wheels at a second speed within a second given wheel speed interval and calculating a second stored curve parameter based on a reciprocal value of the curve radius of each wheel from the respective wheel speed measured at the second speed;
  storing the first stored curve parameter and the second stored curve parameter in a long term memory;
  monitoring the current wheel speed of each wheel of the set of wheels during said on-road operation of the wheels and calculating a respective current curve parameter based on a reciprocal value of the curve radius of each wheel from the respective current wheel speed; and
  comparing the respective current curve parameter of each wheel to the appropriate stored curve parameter of each wheel to determine if the wheels are in a straight-ahead driving condition, wherein the determination if the wheels are in a straight-ahead driving condition is taken into consideration for activating a pressure loss detection method.

2. Method as claimed in claim 1, wherein the current curve parameters are averaged.

3. Method as claimed in claim 1, wherein the current curve parameters are filtered.

4. Method as claimed in claim 1, wherein the stored curve parameters are averaged.

5. Method as claimed in claim 1, wherein the stored curve parameters are filtered.

6. Method as claimed in claim 1 further comprising:
measuring, during the curve parameter learning phase, the wheel speed of each wheel of the set of wheels at a third speed within a third given wheel speed interval and calculating a third stored curve parameter based on a reciprocal value of the curve radius of each wheel from the respective wheel speed measured at the third speed, and storing the third stored curve parameter in the long term memory.

7. Method as claimed in claim 1, wherein, during the curve parameter learning phase, only curve parameters measured during a straight-ahead driving condition are stored and curve parameters measured during a non-straight-ahead driving condition are ignored.

8. Method as claimed in claim 7, wherein a second straight-ahead driving detection method is used for detecting the straight-ahead driving condition.

9. Method as claimed in claim 8, wherein the second straight-ahead driving detection method utilizes determined yaw rates, determined transverse acceleration values or a combination thereof.

10. Method as claimed in claim 8, wherein already stored values of the first straight-ahead driving detection method are ignored when a cornering maneuver is detected by means of the second straight-ahead driving detection method.

11. Method as claimed in claim 1, wherein the stored curve parameters are taken into account to calculate driving parameters.

12. Method as claimed in claim 1, wherein the stored curve parameters are taken into account for calculating an actual curve radius.

13. Method as claimed in claim 1, wherein the first straight-ahead driving detection method is integrated into a method for detecting tire pressure loss on the basis of wheel speed information.

14. Method as claimed in claim 13, wherein the pressure loss detection method is activated when the first straight-ahead driving detection method detects a straight-ahead driving condition.

15. Method as claimed in claim 14, wherein calculated driving parameters are taken into consideration for activating the pressure loss detection method.

16. Method as claimed in claim 13, wherein the pressure loss detection method is deactivated when the first straight-ahead driving detection method detects a non-straight-ahead driving condition.

17. Method as claimed in claim 16, wherein calculated driving parameters are taken into consideration for deactivating the pressure loss detection method.

* * * * *